United States Patent

Engel et al.

[11] Patent Number: 6,071,401
[45] Date of Patent: *Jun. 6, 2000

[54] ELECTROLYTIC METHOD FOR PURIFYING GASES

[75] Inventors: Dieter Engel, Rheinfelden; Thomas Lehmann, Langenselbold; Harald Troll, Alzenau, all of Germany

[73] Assignee: Degussa Aktiengesellschaft, Frankfurt, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/838,688
[22] Filed: Apr. 9, 1997
[30] Foreign Application Priority Data Apr. 9, 1996 [DE] Germany ................ 196 14 018

[51] Int. Cl.[7] .................. B01D 17/06; B01D 59/40; B01D 59/50
[52] U.S. Cl. .......................... 205/763; 423/241
[58] Field of Search .............. 204/265, 266, 204/282; 205/763–765; 423/241; 95/57, 79

[56] References Cited

U.S. PATENT DOCUMENTS

| 3,793,171 | 2/1974 | Zabolotny et al. | 95/187 |
| 4,032,415 | 6/1977 | Sanders | 205/348 |
| 4,101,394 | 7/1978 | Johnson | 568/671 |
| 4,313,813 | 2/1982 | Johnson et al. | 204/263 |
| 4,772,366 | 9/1988 | Winnick | 204/128 |
| 4,876,115 | 10/1989 | Raistrick | 427/115 |
| 5,840,174 | 11/1998 | Lehmann et al. | 205/763 |

*Primary Examiner*—Kathryn Gorgos
*Assistant Examiner*—Wesley A. Nicolas
*Attorney, Agent, or Firm*—Smith, Gambrell & Russell, LLP

[57] ABSTRACT

An electrolysis cell with a fixed-bed electrode and its use for the purification of waste gases. The electrolysis cell includes a fixed-bed electrode, a counterelectrode which is separated from it and designed as a gas diffusion electrode, devices for the supply and flow-off of an electrolyte as well as for the inlet and outlet of the gas to be purified and a space associated with the counterelectrode with devices for the supply and the removal of a gas. In order to purify gas the fixed-bed electrode is operated as a trickle bed and the gas to be purified flows in cocurrent or countercurrent flow to the electrolyte. In reductive purification hydrogen is supplied to the gas diffusion electrode and in oxidative purification oxygen is used.

9 Claims, 2 Drawing Sheets

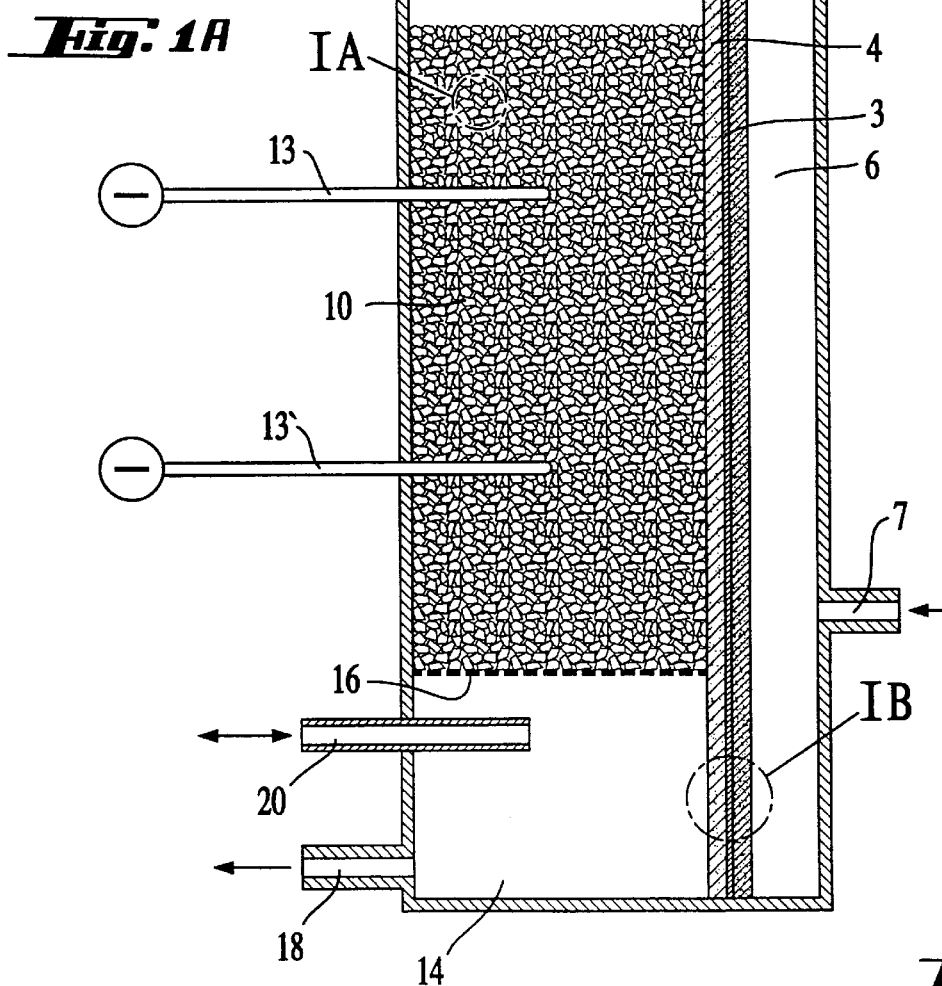
Fig. 1
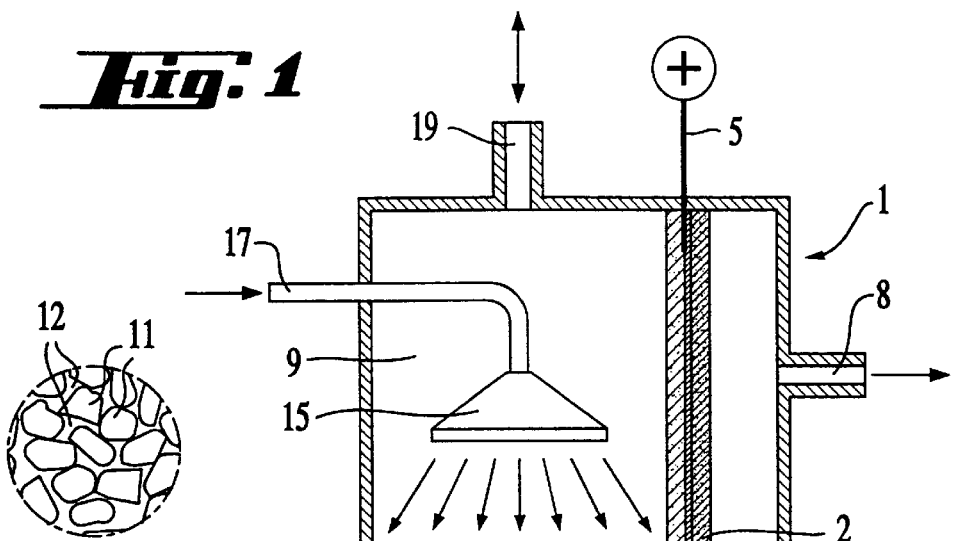
Fig. 1A
Fig. 1B

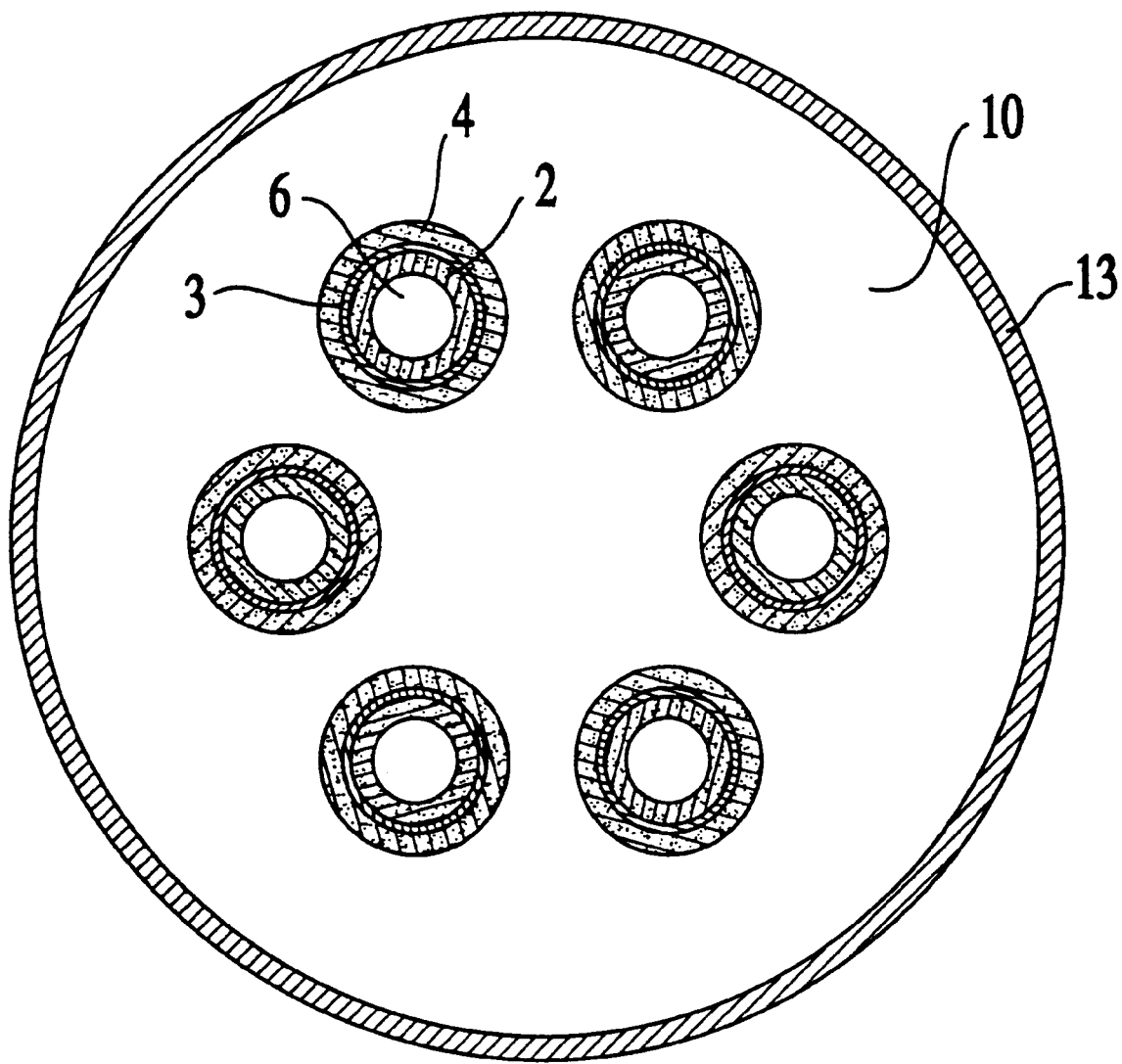

ELECTROLYTIC METHOD FOR PURIFYING GASES

INTRODUCTION AND BACKGROUND

The present invention relates to an electrolysis cell for the electrolytic removal of an electrochemically convertible impurity from gases as well as to a method of purifying gases using this electrolysis cell.

Gaseous pollutants or impurities in gases such as e.g. $Cl_2$, $SO_2$, $NO_x$ and mercaptans can be removed by a wet-chemical wash with a wash solution. Absorption apparatuses such as e.g. packed columns are used for such a purification. In order to obtain a good purifying action the absorbed gaseous component must be rapidly converted. A disadvantage is the necessity of having to use certain chemicals. As a result, a waste-water disposal problem frequently arises on account of the reaction product formed in the wash solution and stemming from a waste gas problem.

Methods are even known for the electrochemical purification of waste gases. In the so-called "outer-cell" methods the gaseous component of a waste gas to be stripped is first absorbed in an absorption column in a wash solution; then the wash solution containing the polluting component is cathodically reduced or anodically oxidized in a connected electrolysis cell. This arrangement requires two different devices, namely one for the absorption and one for the electrolysis. The so-called "inner-cell" methods are more advantageous, in which absorption and electrochemical conversion take place in a reactor, namely in an electrolysis cell, and because the concentration of pollutants is always kept low by electrochemical conversion. In the so-called "indirect" electrolysis processes the oxidizing or reducing agent used in a wet-chemical waste-gas treatment is regenerated by electrolysis of the wash solution used.

An "inner-cell" method suitable for the oxidative or reductive electrolytic purification of waste gases is taught by G. Kreysa et al. in Ger. Chem. Eng. 6 (1983) 325–336: The gas to be purified is brought in contact with an electrolytically conductive wash liquid in an absorption column designed as a fixed-bed electrode. The absorption column contains a packing of conductive particles. The gas to be purified and the wash liquid can be conducted through the column in a cocurrent flow or in countercurrent flow. In both instances a stable two-phase mixture (gas/liquid) should flow through the column. The column should always be flooded and separation of the liquid flow should be avoided. Kreysa et al. show that under the indicated conditions a waste gas containing 5000 ppm chlorine can be stripped using a $K_2SO_4$ catholyte solution and a current of 15 A to 50 ppm chlorine. The method evaluated previously as well as various embodiments of electrolysis cells suitable for this purpose also follow from DE-OS 29 01 577. Such a cell comprises electrode compartments separated by a diaphragm or membrane and with the associated electrodes in which at least one electrode is designed as a fixed-bed electrode. Also, several anodes and cathodes can be combined like a filter press. Several counterelectrodes with counterelectrode spaces and membranes can also be arranged within a larger fixed-bed electrode.

A disadvantage of the method of Kreysa et al. is the high residual content of impurities in the purified gas. In the case of chlorine the residual content is approximately a factor of ten above the limit value of 5 ppm admissible e.g. in Germany.

According to the not yet published DE patent application 195 31 707.6 better degrees of purification can be achieved on the basis of the previously evaluated method of Kreysa if the fixed-bed electrode is operated as a trickle-bed reactor. This procedure leads to lower investment costs than that of the previously known method with flooded reactor and in a considerably lesser residual content of impurities.

A disadvantage of the previously known method is the fact that the apparatus comprising an electrolysis cell requires two liquid circuits, namely a catholyte circuit and an anolyte circuit, as a result of which the device is rendered complicated and trouble-prone.

An object of the present invention therefore is to provide a method which permits the electrochemical purification of gases while using a simpler electrolysis cell and consuming less energy.

SUMMARY OF THE INVENTION

The above and other objects of the invention are achieved by a method for the electrolytic removal of an electrochemically convertible impurity from gases in which the gas to be purified and a liquid electrolyte are conducted in cocurrent flow or countercurrent flow over a fixed-bed electrode of an electrolysis cell and in which the impurity is converted upon an effective cell voltage. The method of the invention features using an electrolysis cell which comprises a counterelectrode separated from the fixed-bed electrode by a separator and is designed as a gas diffusion electrode. It is a further feature of the invention that the fixed-bed electrode is operated as a trickle-bed reactor and that in the case of a cathodic connection of the fixed-bed electrode a gas with oxidizable constituents and in the case of an anodic circuit a gas with reducible constituents is supplied to the gas diffusion electrode.

BRIEF DESCRIPTION OF DRAWINGS

The invention will be further understood with reference to the drawings, wherein:

FIG. 1 is a schematic cross-sectional view of an electrolysis cell in accordance with the invention;

FIG. 1A is a schematic partial sectional view of the packing used in accordance with the invention;

FIG. 1B is a partial cross-sectional view of the anode of the invention; and

FIG. 2 is a cross-sectional view of another embodiment of the invention.

DETAILED DESCRIPTION OF INVENTION

The method of the present invention is carried out using an electrolysis cell 1 in accordance with the invention as illustrated in FIG. 1 which comprises a fixed-bed electrode 10 and a porous counter electrode 2 separated from it by a separator 4 as well as, on the side of the fixed-bed electrode 10, conduit devices for supplying electrolyte (catholyte) 17 and distribution 15 of the electrolyte on the fixed bed. Catholyte collection compartment 14 is provided in addition to a conduit 18 to draw off the electrolyte. Inlet means and outlet means of the gas 19, 20 to be purified are also provided. The counterelectrode 2 is designed as a gas diffusion electrode and an anode compartment 6 is fitted with devices for supplying and removing (7, 8) a gas and arranged on the side of the counterelectrode 2 facing away from the fixed-bed electrode 10.

The electrolysis cell of the invention is not limited to the cathodic, that is, reducing conversion like that which can be carried out in a cell according to FIG. 1. In the case of an anodic, that is, oxidative conversion of impurities in the gas to be purified the fixed bed is connected anodically and sprayed with an anolyte; the gas diffusion electrode is then connected as cathode and loaded with a reducible gas, preferably oxygen.

When the electrolysis cell of the invention is used in the method of the invention, those gases can be purified which contain impurities which can be converted under the electrolytic conditions. The conversion is a reduction or oxidation and the reaction products can react further, if necessary, with constituents of the electrolyte. Reducible impurities such as halogens and especially chlorine can be separated almost quantitatively from the gas in that the latter is conducted over a fixed bed designed as a fixed-bed cathode and an aqueous catholyte, in the case of halogens as impurities an aqueous hydrogen halide acid, trickles over this fixed bed; hydrogen gas is oxidized on the anode. In the case of an anodic connection of the fixed bed and a supplying of a reducible gas, preferably oxygen, to the gas diffusion cathode as well as of the use of an aqueous anolyte, oxidizable polluting gases, e.g. gases containing hydrogen sulfide, alkyl mercaptans or nitrogen oxides, can be purified, during which the oxidation products, that is, the sulfuric acid, alkane sulfonic acid and nitric acid, are dissolved in the anolyte.

FIG. 1 shows a longitudinal section in schematic form through a preferred embodiment of the electrolysis cell in accordance with the invention with cathodic connection of the fixed bed. Electrolysis cell 1 comprises a gas diffusion anode, a cathode designed as fixed bed 10 and separator 4 arranged between the anode and the cathode. The gas diffusion electrode comprises anode support consisting of a porous, conductive material permeable for hydrogen and a catalytically active coating. The support is preferably a carbon material. The anode support is advantageously designed to be laminar, which can include in particular foils or plates, which can also be formed in a tubular shape. Anode coating 3 is located on the side of the anode support facing the cathode in as far as the anode support does not catalyze the oxidation of hydrogen itself. This coating acts as a catalyst for the oxidation of hydrogen to protons which pass through the separator into the cathode compartment. Noble metals and noble-metal alloys are materials for the coating which have a good catalytic action; platinum is preferred. The coating can be applied e.g. by brushing a suspension of extremely finely distributed noble metal onto the anode carrier. The coating is permeable for hydrogen. The anode is contacted via anode connection 5, which is connected to coating 3 of the anode in a preferred embodiment. Anode compartment 6 with devices for supplying (7) and, in as far as hydrogen flows through the anode area, for discharging (8) hydrogen is located on the anode side facing away from the cathode. Devices for maintaining a hydrogen pressure in the anode area are not shown in FIG. 1.

Another purposeful current connection for the gas diffusion electrode takes place via several, at least 2, preferably 2 to 10 contact strips of a noble metal, especially platinum, or of a valve metal, especially tantalum, placed with one end on the electrode. A further connection possibility consists in filling the associated electrode compartment with graphite spheres in such a manner that the electrode is contacted uniformly over the surface; the electric connection then takes place by means of an anode end plate contacting to the graphite spheres.

Separator 4 place between the anode and the cathode can be an ion-permeable membrane or a mechanical separating system, e.g. a microporous diaphragm consisting of an insulating but porous material of e.g. plastic or ceramics. In the case of a cathodic connection of the fixed bed a cation exchange membrane, e.g. one on the basis of aliphatic, perflourinated polyether sulfonic acids (NAFION® membrane) is preferred. In the case of anodic connection of the fixed bed a microporous separating system or an anion exchange membrane is used in a corresponding manner. A plastic grid on the membrane can protect the latter from mechanical damage by particles of the fixed-bed electrode.

Further embodiments of the cell and of the method are presented below using the example of a cell with cathodically connected fixed bed; however, the technical teaching resulting therefrom can also be transferred in a corresponding manner to cells with anodic connection of the fixed bed. The cathode area is filled essentially by a packing of cathode particles which are made of a corrosion-resistant, conductive material; this packing forms fixed-bed cathode 10 (reference numeral 10 thus stands both for the cathode as well as for the actual cathode compartment). As shown in FIG. 1A, Interstices 12 form between cathode particles 11 of the fixed-bed cathode through which interstices the gas to be purified can flow and the liquid catholyte can trickle. The selection of the material for the cathode particles is determined by their corrosion resistance in this environment. Particles of graphite are especially well suited when purifying halogen-containing gases; tantalum is also suitable in principle; however, such particles are more expensive. The packing bodies can be spherical or have a form customary for packing bodies in absorption technology; e.g. rods, saddles, rings. The highest possible volume-specific surface of the packing bodies with the lowest possible pressure loss in the fixed bed is striven for. Instead of particles of graphite, packing bodies, e.g. extruded blanks, of activated carbon are suitable both in the case of cathodic and of anodic connection of the fixed-bed electrode.

The current connection of the fixed-bed electrode takes place by means of one or several feeder rods 13, 13' extending into the fixed bed or by means of one or several current feeder grids or feeder plates arranged in the fixed bed and consisting of a corrosion-resistant material with good conductivity, e.g. a valve metal, especially tantalum.

Catholyte collection compartment 14 for receiving the catholyte trickling through the fixed-bed cathode and a conduit device for its discharge 18 are advantageously located below the fixed-bed cathode arranged on perforated carrier plate 16. The catholyte is supplied via line 17 to catholyte distributor 15 and distributed from there by spraying uniformly over the surface of the fixed bed. A uniform supply of catholyte is necessary in order to avoid a canal formation and backup of liquid in the fixed bed.

The gas to be purified is supplied to the fixed bed from below in the case of a countercurrent flow operation and from above in the case of a cocurrent flow operation and removed on the respective opposite end. Accordingly, lines 19, 20 for supplying the gas to be purified and to remove the purified gas are arranged on the electrolysis cell in the space above and in the space below the fixed-bed cathode. Line 19 advantageously connected into gas collection space 9 at the head of the column and the other line 20 into catholyte collection compartment 14 at the foot.

Details of the arrangement of the anode carrier 2, anode coating 3 and separator 4 are shown in FIG. 1B.

Aside from the embodiment shown in FIG. 1 the fixed-bed cathode and gas diffusion anode with the separator located between them can also be arranged in another manner. Thus, for example, several electrolysis cells in accordance with the invention can be connected together like a filter press in a known manner. According to another embodiment one or several tubularly designed gas diffusion anodes can be arranged within a packing of cathode particles forming a fixed-bed cathode. FIG. 2 shows a cross section of such an arrangement: The tube wall of the gas diffusion anode comprises, from the inside to the outside, support 2, anode coating 3 as well as separator 4; the inner compartment of the tube corresponds to anode compartment 6; cell housing wall serves here for the contacting of fixed-bed cathode 10. The packing of the fixed bed is not shown. The principle shown in FIG. 2 can be applied in an analogous manner to cells with anodic connection of the fixed bed and a gas diffusion cathodic connection of the electrode.

In order to carry out the method of the invention using a cell with cathodically connected fixed-bed electrode the gas diffusion anode is loaded with hydrogen. The $H_2$ pressure in the anode space 6 is regulated in such a manner that no breakthrough of $H_2$ into the fixed bed 10 of the cathode occurs. Hydrogen is oxidized at the three phase boundary between the catalytically active parts of the anode, electrolyte and hydrogen gas, during which the electrons are removed via the bonding. This oxidation takes place almost without overvoltage, which results, in comparison to previous methods, in a distinctly lower consumption of energy. The protons formed in the oxidation pass through the cation exchange membrane in as far as one is present as separator.

An essential feature of the invention is the fact that the electrolyte absorbing the reduced or oxidized impurity of the gas, in the removal of e.g. chlorine from gases usually dilute hydrochloric acid and in the removal of e.g. hydrogen sulfide a dilute solution of sulfuric acid, trickles over the fixed-bed electrode. The fixed-bed electrode is thus operated in the form of a trickle bed. Whereas Kreysa et al. (Ger. Chem. Eng. 6 (1983) 325–336, especially page 329) expressly teach the maintaining of a stable two-phase flow during the electrolysis within the fixed-bed electrode and maintaining the fixed-bed electrode in a flooded state therewith, according to the invention the fixed-bed electrode is always operated in a non-flooded state. The electrolyte forms a liquid film with a large exchange surface on the particles of the fixed-bed electrode. Due to this increased exchange surface the exchange of materials between the liquid and the impurities of the gas is improved, which yields a significantly higher degree of purification of the gas. As a result of the operation of the fixed-bed electrode as a trickle bed the pressure in the trickle bed is only a fraction of that which must be overcome in the operation of a flooded fixed-bed electrode.

The gas to be purified and the electrolyte absorbing the impurities can be conducted over the fixed-bed electrode either in cocurrent or in countercurrent. However, in each instance the electrolyte trickles from above downward through the packing of particles of the fixed-bed electrode. It is especially preferred that gas and electrolyte are conducted in countercurrent. The trickling density (amount of catholyte per cross-sectional area and hour) and the amount of gas flowing in the opposite direction are adjusted in such a manner that no flooding takes place.

In order to operate the electrolysis a current is applied and the current intensity increased until an effective voltage has been reached. The electrolysis is usually carried out with a current density in a range of 3 to 20 A, especially 3 to 10 A and at a voltage in a range of 2 to 6 V. The effective current density and the potential decrease as the bed depth increases. Accordingly, an expert in the art will determine the optimum bed depth by orienting experiments.

Advantages of the method of the invention are the simpler design of the cell on account of the elimination of a circuit for a second liquid electrolyte, the degree of purity, which is considerably greater than in the previously known method, the simple manipulation of the fixed-bed electrode operated as a trickle bed and, in particular, the lower energy consumption, caused by the reduced overvoltage as well as by the low pressure loss. A further advantage is the fact that the ratio of the volume flow of the gas to be purified to the wash solution trickling over the fixed bed and acting as electrolyte and absorption agent was increased in comparison to the previously known method and that the space-time yield could be increased therewith.

The invention will now be explained further by the following illustrative examples.

EXAMPLE 1

Depletion experiments with a waste gas containing 0.1% by volume $Cl_2$ were carried out with the cell shown in FIG. 1 with a gas diffusion anode consisting of a graphite support with a Pt coating. In order to avoid a short circuit a microporous membrane was placed between the gas diffusion electrode and the graphite bed.

In order to achieve a depletion of approximately 100% at maximum gas density care must be taken to obtain a good contacting of the gas diffusion electrode. A uniform and sufficiently large number of electric contacts on the gas diffusion electrode have a favorable effect on the cell voltage and on the achievable gas throughput. The best result is obtained if the anode compartment is filled with graphite spheres, thus producing an optimum contact to the gas diffusion anode using an anode end plate (see table 1).

The pressure difference between the anode compartment and the cathode compartment must not be more than 0.5 mbar with an uncoated gas diffusion electrode.

TABLE 1

Test results with differing contact means of the gas diffusion electrode

| Contact | 2 Pt strips | 8 Ta strips | Graphite spheres |
|---|---|---|---|
| Gas density ($m^3/(m^2 \cdot h)$) | 37 | 75 | 123 |
| Cell voltage (V) | 3.3 | 2.9 | 2.2 |
| Degree of depletion of chlorine % | 100 | 100 | 99.96 |

EXAMPLE 2

A gas diffusion electrode coated with NAFION® as cation exchange membrane is inserted into the cell shown in FIG. 1. The gas diffusion electrode was produced by pressing together platinized black and polytetrafluoroethylene. A larger pressure difference than 0.5 mbar is possible between the anode compartment and the cathode compartment on account of the 40–50 $\mu$m thick coating with the Nafion® membrane, nearly not permeable for gases.

TABLE 2

Test results with NAFION ®-coated gas diffusion electrode

| gas density ($m^3/(m^2 \cdot h)$) | 75 |
|---|---|
| Cell voltage (V) | 2.7–3.3 |
| Degree of depletion of chlorine (%) | >99.95 |

Further variations and modifications of the foregoing will be apparent to those skilled in the art and are intended to be encompassed by the claims appended hereto.

German priority application 196 14 018.8 is relied on and incorporated herein by reference.

We claim:

1. A method for the electrolytic removal of an electrochemically convertible impurity from a gas, comprising:

conducting the gas to be purified over a fixed-bed electrode of an electrolysis cell;

conducting a liquid electrolyte along the fixed-bed electrode so as to operate the fixed-bed electrode as a trickle-bed reactor through which the liquid electrolyte is trickled in a non-flooded state;

supplying a purifying gas to a counterelectrode which is a gas diffusion electrode separated from the fixed-bed electrode by a separator; and converting the impurity by supplying an effective cell voltage.

2. The method according to claim 1, wherein the purifying gas is, in the case of a cathodic connection of the fixed-bed electrode an oxidizable gas, and which is, in the case of an anodic connection of the fixed-bed electrode a reducible gas.

3. The method according to claim 1, wherein said liquid electrolyte is conducted in a cocurrent or in a countercurrent flow with respect to the gas to be purified.

4. The method according to claim 1, wherein said liquid electrolyte is conducted in a countercurrent flow with respect to the gas to be purified.

5. The method according to claim 1, wherein said separator comprises an ion-permeable membrane.

6. The method according to claim 1, wherein said separator comprises a mechanical separating system.

7. The method according to claim 1, wherein said fixed-bed electrode is comprised of a plurality of carbon pieces having a coating of platinum.

8. The method according to claim 7, wherein a bonding of said fixed-bed electrode is accomplished by at least one bonding rod extending into the fixed bed.

9. The method according to claim 1, wherein the gas to be purified is a chlorine-containing gas, wherein the gas diffusion electrode is connected as an anode having a surface effective for the catalytic oxidation of hydrogen, and wherein said liquid electrolyte is a dilute aqueous solution of hydrochloric acid provided as catholyte into said trickle bed reactor.

* * * * *